US010163332B2

(12) United States Patent
Vallaire

(10) Patent No.: US 10,163,332 B2
(45) Date of Patent: *Dec. 25, 2018

(54) EMERGENCY ALERT WARNING SYSTEM AND METHOD

(71) Applicant: ADVANCED COMPUTER AND COMMUNICATIONS, L.L.C., Baton Rouge, LA (US)

(72) Inventor: Darren M. Vallaire, Baton Rouge, LA (US)

(73) Assignee: ADVANCED COMPUTER AND COMMUNICATIONS, L.L.C., Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,347

(22) Filed: Jan. 13, 2017

(65) Prior Publication Data

US 2017/0294111 A1 Oct. 12, 2017

Related U.S. Application Data

(63) Continuation of application No. 14/081,039, filed on Nov. 15, 2013, now Pat. No. 9,547,978, which is a continuation of application No. 13/221,361, filed on Aug. 30, 2011, now Pat. No. 8,653,963, which is a continuation-in-part of application No. 12/705,191, filed on Feb. 12, 2010, now Pat. No. 8,009,035, which is a continuation-in-part of application No.

(Continued)

(51) Int. Cl.
*G01W 1/10* (2006.01)
*G08B 27/00* (2006.01)

(52) U.S. Cl.
CPC .......... *G08B 27/001* (2013.01); *G08B 27/00* (2013.01); *G08B 27/008* (2013.01)

(58) Field of Classification Search
CPC ... G01W 1/10; G01W 1/02; G01W 2001/006; G01W 2203/00; G06F 11/3058
USPC .......... 340/539.13, 539.1, 601, 825.69, 506; 455/414.3, 505
See application file for complete search history.

(56) References Cited

U.S. PATENT DOCUMENTS

| | | | |
|---|---|---|---|
| 3,774,842 A | 11/1973 | Howell | |
| 4,860,352 A * | 8/1989 | Laurance | G01S 19/00 380/258 |
| 5,587,715 A | 12/1996 | Lewis | |

(Continued)

FOREIGN PATENT DOCUMENTS

| | | |
|---|---|---|
| JP | 2001-99665 | 4/2001 |
| JP | 2006-301969 | 11/2006 |
| JP | 2009-053185 | 3/2009 |

*Primary Examiner* — Phung Nguyen
(74) *Attorney, Agent, or Firm* — Steptoe & Johnson LLP

(57) ABSTRACT

An emergency alert system, method device are disclosed. The invention employs an emergency alert message, which directs end users to take some particular action like evacuating an identified geographic area. The invention further employs a geographic area message, which is based on a particular geographic area within which all persons should receive the emergency alert message. The invention utilizes an emergency alert enabled device that receives both the emergency alert message and the geographic area message. The emergency alert enabled device determines whether it is located within the geographic area of concern, and if so, presents the emergency alert message to the end user.

19 Claims, 8 Drawing Sheets

Related U.S. Application Data

11/712,652, filed on Mar. 1, 2007, now Pat. No. 7,679,505.

(56) References Cited

U.S. PATENT DOCUMENTS

| | | | | |
|---|---|---|---|---|
| 5,636,245 | A | 6/1997 | Ernst | |
| 6,084,510 | A | 7/2000 | Lemelson et al. | |
| 6,208,859 | B1 * | 3/2001 | Halvorson | H04B 7/18567 340/988 |
| 6,295,001 | B1 | 9/2001 | Barber | |
| 6,462,665 | B1 | 10/2002 | Tarlton et al. | |
| 6,522,250 | B1 | 2/2003 | Ernst | |
| 6,608,559 | B1 | 8/2003 | Lemelson et al. | |
| 6,646,559 | B2 | 11/2003 | Smith | |
| 6,693,555 | B1 | 2/2004 | Colmenarez | |
| 6,696,942 | B2 | 2/2004 | Sweatt | |
| 6,882,837 | B2 | 4/2005 | Fernandez et al. | |
| 6,995,686 | B2 | 2/2006 | Gosdin et al. | |
| 7,053,780 | B1 | 5/2006 | Straub et al. | |
| 7,109,859 | B2 | 9/2006 | Peeters | |
| 7,176,813 | B2 | 2/2007 | Kawamata | |
| 7,181,228 | B2 | 2/2007 | Boesch | |
| 7,212,134 | B2 | 5/2007 | Taylor | |
| 7,248,159 | B2 | 7/2007 | Smith | |
| 7,496,183 | B1 | 2/2009 | Rodkey et al. | |
| 7,519,165 | B1 | 4/2009 | Rodkey et al. | |
| 7,675,423 | B2 | 3/2010 | Boiling et al. | |
| 7,773,729 | B2 | 8/2010 | Rodkey et al. | |
| 8,180,366 | B2 * | 5/2012 | Ernst | H04L 51/12 455/456.1 |
| 8,190,118 | B2 | 5/2012 | Sennett | |
| 8,190,130 | B2 | 5/2012 | Dillon | |
| 8,250,270 | B2 | 8/2012 | Vossen | |
| 8,321,124 | B2 | 11/2012 | Curatolo | |
| 2002/0080038 | A1 * | 6/2002 | Smith | G01W 1/02 340/601 |
| 2004/0104841 | A1 | 6/2004 | Syrjarinne | |
| 2004/0119591 | A1 | 6/2004 | Peeters | |
| 2005/0012628 | A1 | 1/2005 | Kadner et al. | |
| 2005/0075095 | A1 | 4/2005 | Dillon | |
| 2005/0136912 | A1 | 6/2005 | Curatolo et al. | |
| 2005/0143096 | A1 | 6/2005 | Boesch | |
| 2006/0267783 | A1 | 11/2006 | Smith | |
| 2008/0186163 | A1 | 8/2008 | Mills | |
| 2009/0005019 | A1 | 1/2009 | Patel | |
| 2009/0247116 | A1 | 10/2009 | Sennett et al. | |
| 2009/0300257 | A1 | 12/2009 | Vossen | |
| 2009/0325535 | A1 | 12/2009 | Felt et al. | |

* cited by examiner

EMERGENCY ALERT WARNING SYSTEM AND METHOD

PRIORITY CLAIM

This application is a continuation of U.S. patent application Ser. No. 14/081,039, filed Nov. 15, 2013, now U.S. Pat. No. 9,547,978, which is a continuation of U.S. patent application Ser. No. 13/221,361, filed Aug. 30, 2011, now U.S. Pat. No. 8,653,963, which is a continuation in part of U.S. patent application Ser. No. 12/705,191, filed Feb. 12, 2010, now U.S. Pat. No. 8,009,035, which is a continuation in part of U.S. patent application Ser. No. 11/712,652, filed Mar. 1, 2007, now U.S. Pat. No. 7,679,505. Each patent application identified above is incorporated here by reference in its entirety to provide continuity of the disclosure.

FIELD OF THE INVENTION

This invention relates in general to a method and apparatus for communicating emergency alert messages to members of the public. The invention provides an improved emergency alert system that allows for reliable transmission of emergency information to persons within a geographic area of concern.

BACKGROUND AND SUMMARY OF THE INVENTION

Emergency alert systems are widely used. One common example of such a system is the emergency broadcast system used on television and radio. This system is often used to transmit information about potentially dangerous weather conditions. Other emergency alert systems rely on land-based telephone systems to send recorded messages to all persons within a particular area. Evacuation orders are another form of an emergency alert message, and these orders may rely on telephone systems, door-to-door communication by law enforcement officers, and other emergency communication methods.

AS the public has become more concerned about terrorism threats and as communication systems have become more pervasive, a need has arisen for a better emergency alert system. Existing technologies suffer from many problems. A door-to-door communication of emergency information is effective at targeting only persons actually located in the area deemed to be at risk. Though door-to-door communication can be slow the speed of this method depends on the number of persons to be contacted and the number of persons going door-to-door—it does provide the emergency information to the relevant members of the public. This benefit, however, comes at a very high price. Dedicating many law enforcement officers' time to going door-to-door costs a great deal of money and creates troublesome opportunity costs. If three-fourths of the local police force is going door-to-door to warn persons about an emergency situation, those officers cannot be patrolling for crimes or other problem situations. Though it is one means of geographically disseminating an emergency alert, door-to-door emergency communication is typically seen as a means of last resort.

Sirens also have been used to alert persons to emergencies. A siren system is perhaps most effective for a particular purpose. A chemical plant, for example, might use sirens to warn persons near the plant of a problem. Sirens have limited range and require regular upkeep. Sirens typically do not provide situation-specific information. Persons inside houses or in automobiles may not hear sirens even when they are relatively near the siren. The one upside to sirens is their partial geographic selectivity. Only persons within a certain radius of the siren will get the alert. Even this advantage is limited, however, because in most emergencies, the alert area will not be a perfect circle around a particular siren. For these reasons, sirens remain a generally poor means of alerting persons of an emergency.

The emergency broadcasting system (EBS) sends emergency alert messages via live television and radio feeds. Though this system can reach many persons quickly, its reach is both too broad and too narrow. It is too broad because an entire television and radio broadcast region will be covered when most emergency alerts are relevant to only some part of that region. It is too narrow because even persons who are using their televisions or stereos may not be receiving a live television or radio transmission. Television viewers may be watching a move on DVD, watching a pre-recorded television program, or viewing a satellite television broadcast. Persons listening to stereos may be listening to satellite radio or a music CD. None of these persons would receive the EBS alert.

Automated telephone calling systems are widely used for sending emergency alert messages. This system is geographically specific, because only those phones within a defined alert area will be called. There are, however, several problems with these systems. They are expensive to purchase and use. They do not reach nearly all the relevant public. Many persons miss phone calls, and most of these systems call only landline phones. That excludes all cell phones and VOIP phones. Because some numbers must be called many times to reach a person, this process also can be slow. Finally, when a telephone alert system is used, it can jam the local telephone switching network, thus slowing the system and making it very difficult for local persons to use their own phones.

Internet and e-mail also maybe used to send emergency alert information. This process can work quickly, but it has limited reach. It is also not geographically limited.

Given the heightened concerns with emergency threats and the many flaws in existing emergency alert systems, there exists a need for a better system. Such a system should operate quickly and reach all persons within the appropriate geographic area. It should be affordable to own and operate. A cost-effective geographically targeted emergency alert system is needed.

Some geographic targeting has been attempted in the area of emergency alerts and other geographically targeted alerts. For example, the widely-used cellular telephone system has been used to provide a certain type of geographically targeted messaging. Cellular transmissions are relatively short-range transmissions, and therefore many cell towers are required throughout a geographic region to ensure continuous, or nearly continuous coverage. When a particular cell tower transmits a message, that message will reach a limited geographic area.

If a cell tower transmits omni-directionally, the geographic area reached by the transmission will be generally circular. Those cell phone users with the right type of phone and who are located within the broadcast range of the transmitting tower will receive the message. More recently, technologies have been developed to allow cell towers to transmit somewhat directionally, which produces a pie or wedge-shaped coverage area.

Some cell systems also geographically target cell users based on the residence area of the user. This approach fixes a particular location or area for a user based on where the user lives or works. Other alert systems have used a similar approach in the past. For example, some tornado warning systems alert users based on a pre-determined, fixed location for the user. All systems of this type suffer from one major problem: they are used pre-determined, fixed location information for users who are highly mobile. These systems are not dynamic. They cannot account for movement of persons.

This reliance on fixed location data is a major drawback, because the system will miss in two important ways. First, this type of system will fail to alert visitors to the area of pending emergencies. A person who is visiting an area when a tornado strikes would not receive a warning with this type of system. Second, this type of alert system will warn residents who are not within the alert area. A person who resides in the warning area, but who is away at the time of the warning, will receive the alert. These two problems greatly reduce the efficacy of these types of warning systems.

The cellular tower location systems, using either omni-directional or semi-directional transmissions provide one means of resolving these problems. Only users who are physically within a geographic area will get the alerts. To achieve this result, however, the systems must limit the alert transmissions to rather crudely-defined geographic areas. Persons currently outside the broadcast area, but who are traveling toward the area, will receive no alert until within the broadcast area. Moreover, if the actual emergency is more localized than the cellular transmission area, this type of system will present the alert to persons outside the danger area.

Though the cellular transmission systems provide improvement over systems that rely on pre-determined, fixed user location data, the improvement is limited. To appreciate why, one must understand the two basic approaches to this problem. One approach is to consider the problem from the perspective of the alert transmission. This approach can be thought of as a "front-end" approach. The second approach is to consider the problem from the perspective of the users, the persons or businesses in a geographic area facing some risk. This approach can be thought of as a "back-end" approach.

All the systems described above are front-end systems. None of these systems rely on discrimination or decision at the user end. The geographic targeting all comes from the transmission end. The cellular tower systems are a good example. These systems are direction, but only in a front-end sense. All discrimination (i.e., all decisions concerning who gets an alert) is done at the front-end.

What is needed is back-end solution to this problem, and one that allows for dynamic location fixes for users. An example of a crude back-end system would be one in which a message is broadcast to a large audience, and the members of the audience are to make their own determinations of whether the message is relevant to them. One simple example might be a PA announcement at a large sporting event (e.g., a football game) asking the person with the red convertible to move it from in front of the ticket office. The message of broadcasts to a large audience, and the members of that audience perform the discrimination steps of the process. Presumably, only the person (or persons) who parked a red convertible in front of the ticket office will respond to the message.

This general concept (i.e. back-end discrimination) has not been used in emergency alert systems. Perhaps this is because of a concern that widespread dissemination of targeted alert messages could induce hysteria. Or perhaps it is because those responsible for sending emergency messages tend to work at front-end facilities and have only considered the problem from that perspective. But whatever the reason for this focus, there has been a lack of attention on back-end type alert systems. There is, therefore, a real need for an improved, dynamic alert system that relies on back-end discrimination. Such a system would allow for relatively large area broadcasts of alert messages, potentially advising persons who are outside the alert area but approaching it. Such a system would also allow for precise area definition, or precise target audience definition (e.g., only firefighters or EMTs). It would not rely, however, on the individual user to perform the discrimination process (as in the football game example), but would use a technological solution. This new technology would perform the discrimination and then alert the user, if and only if, the user is within the relevant geographic area and/or is within the relevant target audience.

The present invention provides such an emergency alert system (EAS). The invention provides a method of sending geographically-targeted emergency alert messages to emergency alert enabled devices (EAEDs) operated by end users. Only those EAEDs within the geographic area at risk are notified of the emergency. The EAEDs are small devices that may be embedded within host devices such as cell phones, automobile stereos and/or navigation systems, televisions, radios, computers, mp3 players, land-line telephones, and virtually any other host device with the capacity to communicate message content to an end user. By incorporating the EAEDs into a wide variety of hosts, the present invention creates an EAS with the potential to reach virtually all appropriate persons very quickly. It is reliable, easy to operate, fast, and is geographically selective. It also requires only routine upkeep.

The EAEDs of the present invention perform the discrimination step of the process. It is a back-end solution to the problem of deciding who should receive an alert. And because it relies on real-time location information, the EAED provides dynamic discrimination that is independent of the front-end transmission. In other words, the frontend transmission need not be geographically limited, though in most instances some limitation will be used. The transmissions can cover an area far larger than the alert area. No shaping of the alert transmissions, no selection of only certain transmitters need be used. The EAED performs the discrimination by comparing its present location to geographic area information in a received message. This approach to the geographic targeting problem is fundamentally different from the front-end systems briefly described above. And the present invention's back-end solution provides numerous advantages, as will be made evidence by the detailed description of the invention below.

In a preferred embodiment, the invention includes an emergency operations center that selects an emergency alert message and identifies a geographic area of concern; an emergency alert transmission center that transmits the emergency alert message and a geographic area message that is representative of the geographic area of concern; a satellite that receives the emergency alert message and the geographic area message and retransmits these messages back to earth; and, an emergency alert enabled device that receives the retransmitted emergency alert message and geographic area message and that presents the emergency alert message if and only if the emergency alert enabled device is located within the geographic area of concern.

DETAILED DESCRIPTION OF THE INVENTION

Figure 1:
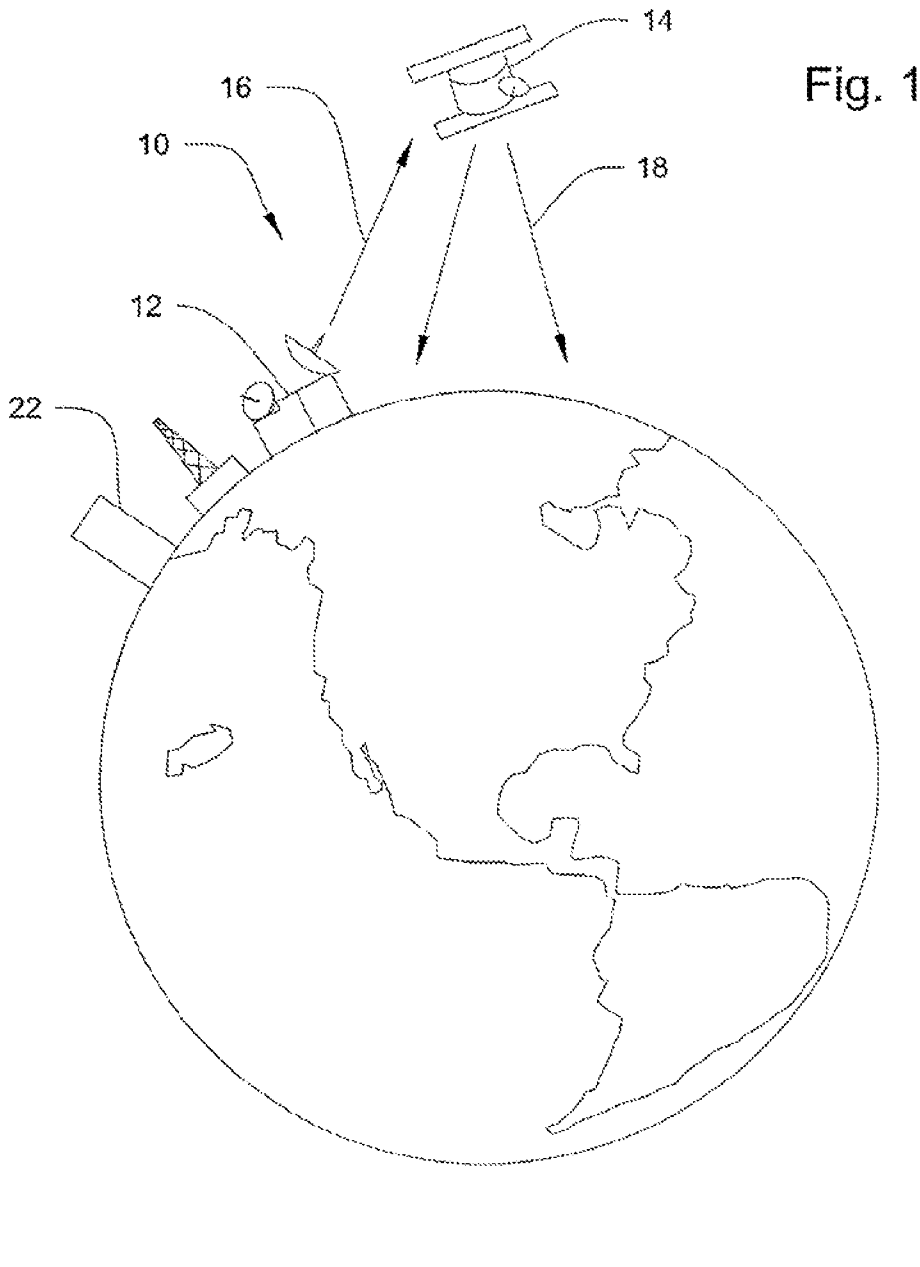
FIG. 1 is a graphical representation of the present invention.

Key elements of an EAS 10 are shown generally in FIG. 1. An emergency alert transmission center 12 receives an emergency alert message and geographic data from an emergency operations center (EOC) 22, and transmits one or more signals 16 to an emergency system satellite 14. The signals 16 correspond to a geographic area message, which is based on a geographic area of concern, and an emergency alert message, which is intended for persons located within the geographic area of concern. The EOC 22 and the emergency alert transmission center 12 could be a single facility or could be separate facilities. In a preferred embodiment, the emergency alert transmission center 12 is a separate facility and serves a number of EOCs 22 from different geographic areas. For example, a single emergency alert transmission center 12 would be capable of serving EOCs 22 from numerous states, cities, or other areas. The emergency alert transmission center has one or more transmitters for sending the required messages to emergency system satellites 14.

Though the invention is shown using a satellite 14 for the retransmission of the emergency alert message and geographic area message to earth, other means of transmitting these messages may be used. The cellular system provides the capability to transmit to nearly all of the geographic area of the United States and many other developed countries of the world. The emergency alert transmission center 12 may send emergency alert messages and geographic area messages via cellular transmissions, either as an alternative, or in addition to, satellite transmissions. The use of satellite transmissions is preferred, but the invention is not limited in this regard.

The Internet provides an example of an alternative transmission means. The emergency alert and geographic area messages could be transmitted via the Internet to devices capable of receiving both Internet signals and GPS signals. In this embodiment, the alert device would receive the emergency message and the geographic area message via the Internet and then compare the geographic area message to the GPS location data for the device in real time. If the GPS data indicates that the device is located within the geographic area of concern, the emergency message would be transmitted. This embodiment may be of particular utility for persons with GPS enabled cellular phones that also have the capability to receive wireless Internet signals. Such phones are becoming increasingly common, making this embodiment a more viable alternative to the system that uses satellite transmissions for all messages and data.

The invention may be used with a single emergency alert transmission center 12 that handles all the satellite transmission tasks for several EOCs 22. There are existing EOCs located throughout the world. Most regional governmental bodies (e.g., state, county or parish, and city governments) operate such EOCs. Some of these EOCs have satellite transmission capabilities and some do not. By routing all the EAS messages through a dedicated emergency alert transmission center 12, a substantial cost-savings may be passed on to the tax-paying public. In addition, using a dedicated emergency alert transmission center 12 may improve the efficacy of the system by ensuring that no conflicting messages are sent by different EOCs 22. On the other hand, it may be more desirable to have multiple EOCs with the capability to use the current invention independently of each other, with each EOC communicating directly with the appropriate satellites or other transmission system. This embodiment of the invention would distribute the potential failure points, thus reducing the risk of a single point of failure disabling the system. Which embodiment ultimately is preferred may depend upon the circumstances at the time the system is implemented.

Figure 2:
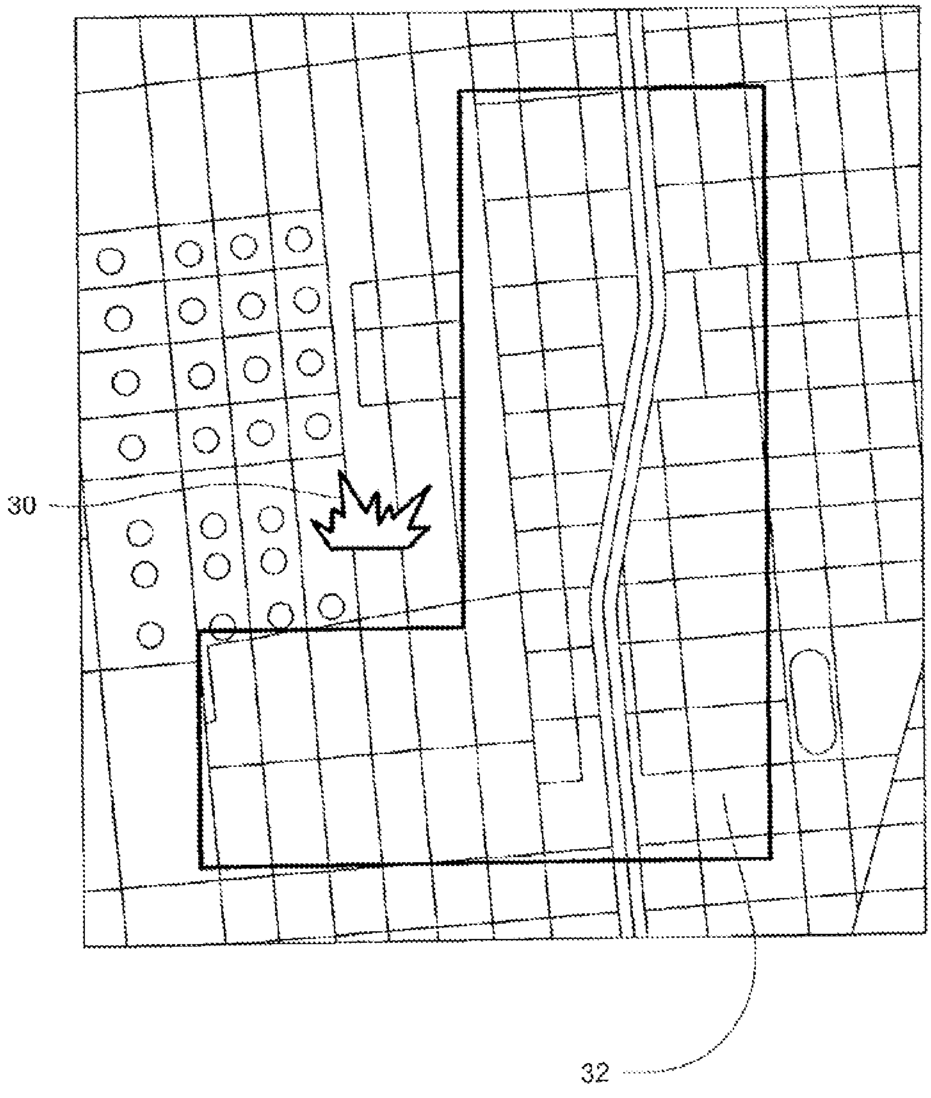
FIG. 2 is a graphical representation of certain steps of a preferred embodiment of the invention.
Figure 3:
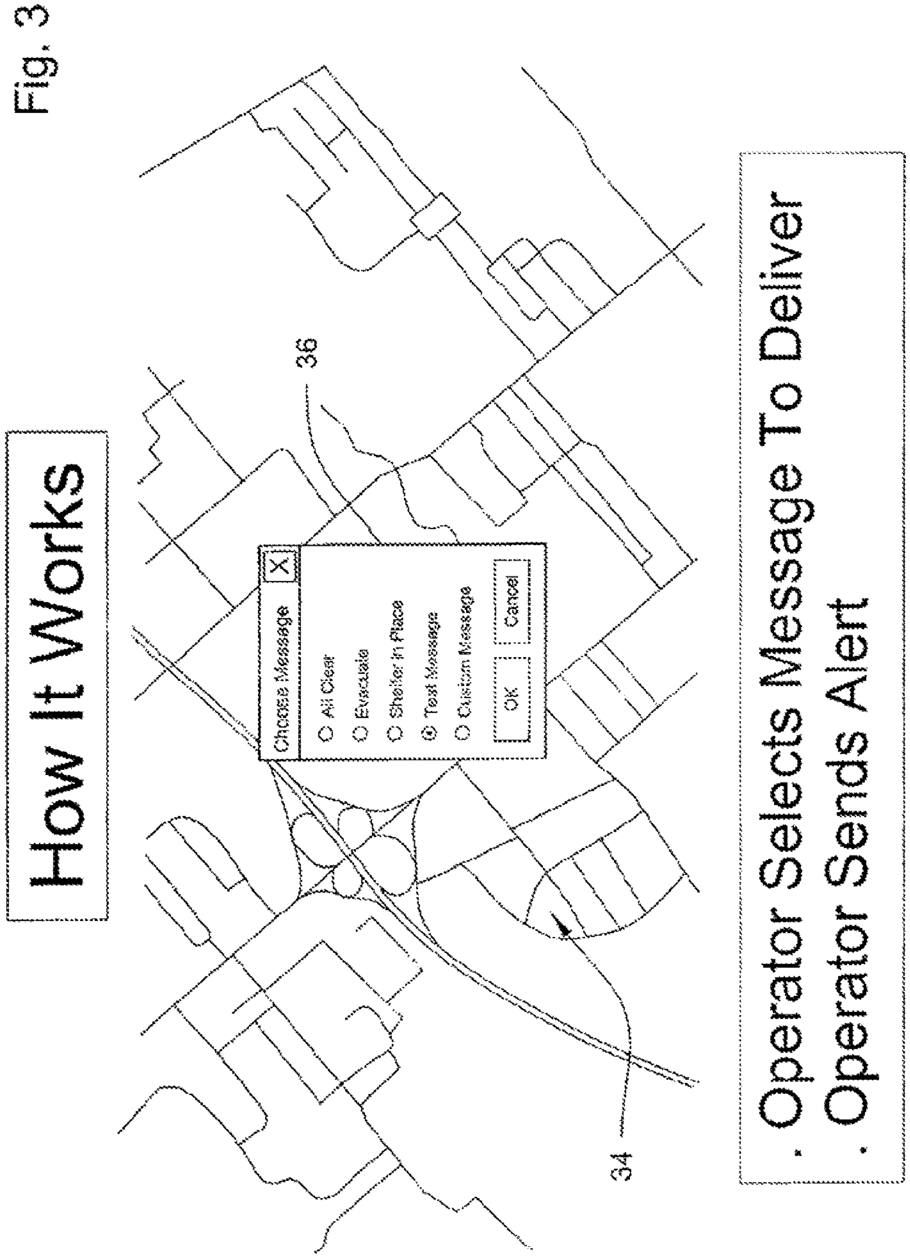
FIG. 3 is a graphical representation of additional steps of a preferred embodiment of the invention.

The emergency system satellite 14 retransmits one or more signals 18 back to the earth, where these transmissions are received by emergency alert enabled devices (EAEDs) 20. As described above, these signals 18 correspond to a geographic area message and an emergency alert message. The EAEDs are not shown in FIG. 1, but will be discussed in more detail below. FIGS. 2 and 3 show steps of a preferred embodiment of the invention. FIG. 2 is an overhead representation of a illustrative geographic region. An emergency situation has occurred at a site 30, and personnel at an EOC 22 (not shown in FIG. 2) have decided that an emergency alert message should be communicated to all persons within a particular geographic area of concern 32, which is shown in blocked off form in FIG. 2. The geographic area of concern 32 could be circular, semi-circular, rectangular, or take any other shape, including a freehand drawing. Handles or other common tools may be used by operators to easily expand or contract all or parts of a defined geographic area. Operators at the EOC must make a determination of what geographic area 32 should be notified of the emergency.

In the hypothetical illustration shown in FIG. 2, a fire has occurred at a chemical facility, posing a risk of hazardous airborne materials in an area nearby and downwind of the fire location. Operators at the EOC are informed of the emergency and the risk. The operators then determine an appropriate geographic area 32 within which all persons must receive the alert message. The system thus creates and transmits geographically targeted emergency alert messages. Only those persons within the relevant geographic area are targeted for message transmission. Using the present invention, an operator might use geographic mapping software to define an alert area. This process could use electronic street maps, satellite images, or combined satellite images overlaid with street map information.

Though the invention may use electronic maps, the present invention is not dependent upon maps or the mapping process. The invention may use actual latitude and longitude coordinates to define the area of concern and to establish the exact location of a particular user. This approach provides accurate and reliable position information. Maps may be out dated or otherwise inaccurate. In addition, persons may be in an uninhabited area on a map (e.g. on a lake or in a forest), but the present invention may still be able to reach those persons if they are located within the area of concern for the emergency. Most prior art systems rely, to some extent, on maps, either hard-copy or electronic, and are, therefore, inferior to the present invention in this regard.

A computer or equivalent device may be used to generate a geographic area message. This message would include an electronic representation (e.g., in the form of an algorithm)

of the geographic area of concern for the particular emergency. The geographic area 32 shown in FIG. 2 is an illustration of a geographic area of concern. A geographic area message might include a series of mathematical expressions that define the geographic area 32 in such a manner that a processor in an EAED 20 may use the expressions to determine whether the actual geographic location of the EAED 20 is within the area of concern.

In this example, an EOC operator defined an alert area south and east of the fire. This is shown by the geographic area 32 in FIG. 2. Data representative of this geographic area is prepared for transmission to the emergency alert transmission center 12. The processing of the geographic area data may be done in various ways that are known to persons skilled in the art.

The invention may also include other enhancements or features at the EOC stage. For example, the EOC part of the system could limit operators' access to only those geographic regions within the jurisdiction of the entity operating the EOC. Or the system could send a message directly to other EOCs for geographic regions that are within the area of concern, but outside the originating EOC's jurisdiction. These features could be implemented in a seamless manner, and could occur automatically when an operator defines an area of concern that extends beyond the EOC's jurisdiction.

The maps used by EOC operators may provide certain detailed information to aid the operators in quickly and accurately identifying an area of concern. Topographical features, such as mountains, might be relevant for this purpose. Prevailing wind patterns might also be provided, as well as evacuation routes, population figures, and other data that may impact the decision of how to define a geographic area of concern. The system also may provide the operator with the physical size of the defined area.

Another useful feature that may be implemented at the EOC stage of the system is the use of moving areas of concern. A weather emergency provides a good example of when such a feature would be desirable. When a dangerous weather system is moving through an area, the defined geographic area of concern should move with the weather system. The current invention can readily accomplish this task by allowing an operator to define a movement pattern for an area of concern based on a prediction of how the area is likely to change over time. The operator also would retain the ability to override predicted movements if the actual conditions warrant (e.g., is the storm dissipates before reaching certain areas).

Similarly, the mapping features of the system may provide an operator with current and predicted weather conditions, so that such conditions can be taken into account in the determination of the geographic area of concern. Even if a moving area of concern is not used, it is often helpful to know what the weather conditions are and will be in the near future. A good example might be an accident causing the release of a dangerous gas. The current wind conditions may be the most important factor in defining the area of concern for such an emergency.

It is desirable to encode the geographic area data in such a manner to limit the size of the message that must be transmitted to and from the emergency system satellite 14. A larger data volume will require more memory resources on the satellite 14 and in the EAEDs 20. In addition, the larger the size of the transmission, the longer the transmission will take. The time difference is not likely to result in a noticeable delay in the response time of the system, but a longer satellite transmission is more vulnerable to interference or interruption than a more brief transmission. In addition, the devices ultimately receive the message may not have a great deal of internal memory, and may tend to limit the size of messages that may be used with the invention. For these reasons, it is desirable to limit the size of the geographic area message.

The geographic area data may be compressed to reduce the SIze of the data transmitted. Such data compression may be done in any suitable manner. Numerous types of digital data compression are known to persons with skill in the art, and no particular method is known to be superior to another for the purposes of this invention. For operational consistency, it is highly preferred that a single data compression scheme be adopted and used by all EAS operators. The compressed geographic area message is transmitted to the emergency system satellite 14 and is then retransmitted to EAEDs 20. In a preferred embodiment, the EAEDs are capable of decompressing the geographic area message. To avoid having to program the EAEDs 20 to recognize and decompress multiple types of data compression, it is, again, highly preferred that a single data compression scheme be adopted and used by all EAS operators. Using a small number of dedicated emergency alert transmission centers 12 would facilitate this objective, because the data compression could be performed by the emergency alert transmission center 12, rather than by the EOCs 22.

The emergency system satellite 14 may store the received emergency alert message and geographic data message for repeated retransmission to earth for some period of time. This may improve the effectiveness of the system by increasing the chances that EAEDs 20 within the geographic area of concern would actually receive the required messages. The satellite 14 also may be able to receive and transmit multiple messages simultaneously.

In addition, the satellite 14 may alter the format of the messages before retransmission, may modify or remove the data compression, or perform other changes to the digital characteristics of the emergency alert message and/or the geographic area message. These types of changes are all within the scope of the present invention, and would still constitute a retransmission of the messages by the satellite 14. As long as the same message content (i.e., the same emergency alert message—for example, to evacuate the area—and the same geographic area of concern) is transmitted by the satellite 14 to earth, such transmission is considered a retransmission of the same messages sent to the satellite 14 from the emergency alert transmission center 12.

In another embodiment of the preferred invention, the EOC 22 provides non-digital geographic area information to the emergency alert transmission center 12, where the geographic area information is then digitized and compressed. For example, the EOC could provide a verbal or written description of the alert area to the emergency alert transmission center 12. The operator at the emergency alert transmission center 12 may then use mapping software to define the geographic alert area, and the geographic area of concern would thus become an appropriate digital, and compressed, geographic area message signal, ready for transmission to the emergency system satellite 14.

The shape of the geographic area of concern may have a significant impact on the size of the geographic area data packet. A circular shape is easy to define digitally and produces a relatively small file size. A convoluted shape with numerous rectangular segments, on the other hand, can be quite difficult to define digitally, and can result in a very large file size. In some instances, it may be preferable to transmit multiple sets of geographic area and alert messages, with the entire geographic area broken down into more easily defined areas. This type of variation, and others intended to facilitate reliable operation of the EAS are within the scope of the present invention.

FIG. 3 represents the next general step of a method of a preferred embodiment of the present invention. This drawing illustrates the emergency alert message selection process 34. In the example shown in FIG. 3, the operator may select from certain standardized alert messages (e.g., evacuate or shelter in place) or may create a custom message. In addition, the present invention contemplates alert messages in text, audio, graphics (e.g., photographs, symbols, or icons), video, or any combination of these communicative methods. For example, an alert might consist of a text message, an audio version of either the same message or a more detailed message, and a video presentation showing a map of the alert area and safe areas.

The emergency alert message may be generated using computer software with a pull down menu 36, as illustrated in FIG. 3. Other means of generating an emergency alert message may include using codes representative of preselected messages and communicating the codes to an emergency alert transmission center 12, where the actual electronic message could be created. Similarly, an operator at the EOC 22 could call in the emergency alert message to the emergency alert transmission center 12, or e-mail or other communication means could be used.

The alert messages may contain more than the alert. For example, each alert message may include a unique serial number identifying the message. This would allow the EOC, satellite, and EAED to identify and distinguish between different messages. This capability could be used to allow the system to retransmit the same alert many times without a user receiving repetitious alerts. If the user's EAED recognizes, by the serial number or other unique identifier, that the message already has been presented, the EAED would not continue to present that same message repeatedly. Validation or authentication information also may be included with the alert message, to ensure the satellite only retransmits valid, authentic alert messages to EAEDs. Error coding may also be included to allow the satellite to detect when a corrupted message is received.

The system also may allow an EOC operation to send an alert message immediately, at a later, predetermined time, or to resend the same message periodically for some period of time (e.g., every five minutes for one hour). The later practice may not be needed often with the present invention because the EAEDs may store received alert devices for a designated time so that such messages may be provided if the EAED moves into the geographic area of concern. For example, if a user's EAED receives an alert message and a geographic area message, but the user is currently outside the geographic area of concern, the EAED would not provide the alert to the user. But if the alert message has a tag indicating it is to be saved for one hour, the user would be notified if he entered the geographic area of concern within one hour of receipt of the alert message. This capability reduces the need to retransmit the same alert message repeatedly. This capability also ensures a user will receive relevant alerts immediately, or nearly immediately, upon entering an area of concern.

The system may be able to provide emergency alerts in multiple languages. EAEDs may provide the operator the option of selecting a language. It also may be desirable to provide EAEDs with the capacity to communicate alerts to deaf and blind persons. Visual displays and speech to text technologies could be used to ensure a deaf user receives emergency alerts. Audible alerts could be selected by a blind user. Text to speech technology could be used for this purpose. A vibration system for EAED's carried by users could be used to inform the user that an alert message has been received.

In another embodiment, the system may allow operators to save newly created alert messages so that the messages can be quickly accessed in the future. The use of speech to text technology could be used to provide a printed copy of a draft alert message, which may provide for more efficient review of the message before transmission. Conversely, text to speech technology could be used at the EOC stage of the system to provide verbal alert messages in addition to text messages.

The EOC part of the system may log all messages sent and save all data (both the alert and geographic portions). Reports may be printed showing what alerts were issued, where they were directed, and when they were transmitted. These capabilities may enhance training and improvement at EOCs.

The EOC or the alert transmission center, if it is a separate facility, may perform authentication communications with the satellite before an alert message is transmitted. By authenticating the link-up in advance, the satellite may be able to more quickly receive and retransmit the alert message. In general, an alert sent using the system and method of the present invention should take no more than 120 seconds (i.e., two minutes) to be received by all EAEDs within the geographic area of concern. This is much faster than existing systems, and it provides the ability to reach a far greater percentage of the public.

In a preferred embodiment, the geographic area message and the emergency alert message are linked in some manner, if not combined into a single packet. Both messages also may be compressed, so that all data transmitted to the satellite is sent in compressed form. The two messages are related to each other, and will be transmitted and retransmitted as a pair of messages, or in some embodiments, as two parts of a single composite message. These variations do not deviate from the invention. In one preferred embodiment, these messages are linked by cross-reference data that allows the two messages to be positively correlated to each other by any device used in the EAS. For example, the transmitter, the satellite, and the EAED all would be capable of recognizing a pair of linked emergency alert and geographic area messages.

Figure 4:
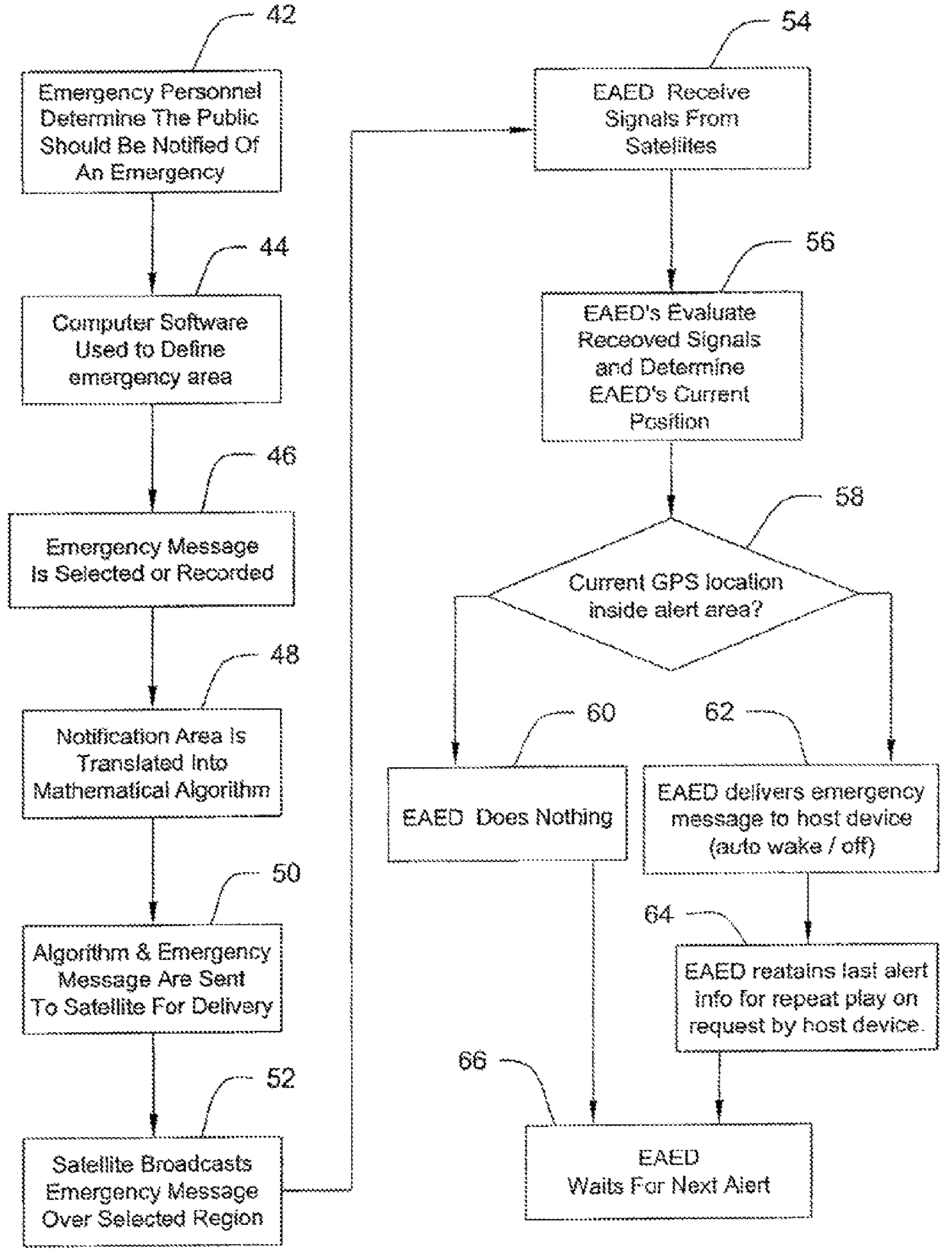
FIG. 4 is a flow chart showing a preferred embodiment of the present invention.

Turning now to FIG. 4, a flow chart 40 is presented. This chart depicts steps of a preferred embodiment of the present invention. The first step shown is the determination by emergency personnel that some segment of the public should be notified of an emergency 42. Once this determination has been made, an operator defines an appropriate emergency alert area using computer software 44. An appropriate emergency alert message then is selected or created by an operator 46. The geographic alert area is converted into a mathematical algorithm for the geographic area signal 48. The geographic data may be compressed as part of this step or an additional data compression step—not shown in FIG. 4—may be used.

This system and method can be used to alert all persons within a geographic area of concern, or it may be used to send alerts to only certain groups. The EAEDs may be programmed to recognize a unique identifier associated with the user of the device or with a group to which the user belongs. Alert messages transmitted using the present invention could use such unique identifiers to single out persons or groups for receipt of targeted messages. This use of a unique identifier could be an alternative to, or in addition to, uses relating to message authentication or corruption. The latter uses were discussed in a preceding part of this description.

The configuration of the system and method described here involves messages that are limited to a geographic area and a particular group of persons within that geographic area. If, for example, there was a need to alert all emergency responders within a certain region, the present invention could do that. The appropriate alert message and geographic area message would be created, and an additional unique identifier—an identifier associated with all emergency responders, but with no other group-would be linked to one or both of these messages. The unique identifier would be transmitted with the messages, and would be received by EAEDs. Only those EAEDs that meet the identity requirement would transmit the alert.

To be more specific, consider a decision by a particular state to activate its National Guard. An appropriate alert message could be prepared—for example, "Report to your National Guard post for further orders." The geographic area message in this instance may be limited to the state calling up its National Guard, or might cover all of the United States. The latter option may be desired, given that some Guard members may be outside the state when the activation is ordered. Finally, a unique identifier associated with members of the National Guard of the activating state would be added to, or linked to, the alert message, the geographic area message, or both.

The EAEDs used by the National Guard members would be programmed to recognize the unique identifier associated with the National Guard, and would present all messages received that match the area requirement and the identity requirement. Because many persons may be members of various groups, it is anticipated that many EAEDs will be programmed to recognize multiple unique identifiers. This configuration is relatively simple to implement, and the use of multiple unique identifiers in an EAED would not burden the memory or processing capacity of the device.

To take another example, consider a wildfire in a Western state. There are many trained, volunteer firefighters in the Western United States who assist when there is a large wildfire. The present invention could be used to reach all such firefighters within a certain distance of the wildfire. In this instance, the geographic targeting and the identity targeting of the present invention are combined. Moreover, the present invention would allow for rapid dissemination of the message to all members of the relevant group.

To implement this capability, it is necessary that members of important groups ensure their EAEDs are properly programmed. This could be done during the training, certification, or licensing of such persons. There could be periodic tests of the system, where each group member is instructed to respond to confirm receipt of the test message.

The capability to utilize identity-based, geographically-targeted alert messages, as described above, provides a great deal of flexibility. For example, in some circumstances, users, or groups of users, may be allowed to opt in or opt out of this service. In other circumstances, the service may be mandatory for certain users or groups of users. The priority of the alert may also be used as a basis to allow users to opt in, opt out, or opt for delayed message presentation. The latter option might allow a user to review lower priority messages at a convenient time, rather than having such messages interrupt other activities. The combinations are essentially endless and can be tailored to fit the needs of each particular group or user.

The combination of real-time geographically targeted alerts to certain groups may be advantageous in numerous contexts. It might facilitate in the call-up of reserve military forces or in an effort to reach all emergency responders, as in the prior example. The technology might also have commercial applications such as geographically and demographically targeted real-time marketing. This capability might be used in political campaigns to reach all campaign workers within a particular region. The commercial applications of the technology, however, should be secondary to the emergency alert purpose of the system.

A computer may be used to digitally encode the geographic area of concern. As there is no current standard format for geographic mapping algorithms, the invention is not limited to any particular format type for the geographic data. Computer software may be used to create a digitized representation of the geographic area of concern. This digital file would be part of, or perhaps all of, the geographic area message transmitted to the satellite and subsequently retransmitted to the EAEDs 20.

The alert and geographic data also may be transmitted to some EAEDs via the Internet. This transmission method could be particularly suitable to persons using GPS enabled smart phones, laptop computers, or netbook computers, all of which often have access to wireless Internet service. With an EAED embedding within such a product, the alert and geographic messages could be received via the wireless Internet signal, and the real-time GPS data used to determine whether the device is within the area of concern.

Once the appropriate alert message signal and geographic area message signal are prepared, these two sets of information are transmitted to one or more satellites 50. The satellites then broadcast the emergency message signal and geographic area message signal to a selected region 52. These broadcasts will cover a much larger geographic region than that selected by the emergency system operator in order to ensure that the entire geographic area of concern is fully covered by the broadcasts. For example, if the emergency alert area includes a part of Houston, Tex., the satellite transmissions might reach users throughout North America. Other satellites broadcasting to other parts of the world would not be used in this example. It is anticipated, however, that use of more than one satellite may be desirable to provide redundancy and thus increase the effectiveness of the invention.

An EAED 20 then receives the satellite transmission of the alert message signal and the geographic area message signal 54. The EAED 20 may use an authentication process to ensure the incoming messages are legitimate. Once these two signals are received and authenticated, an EAED 20 will evaluate the geographic area message and compare the geographic data contained in that message to the EAED's current geographic location 56. The EAED 20 may use a variety of means for fixing its geographic location, but a preferred means is use of the global positioning system or GPS. This is discussed in more detail below. The EAED 20 then performs a decision step. It asks whether the EAED 20 is within the geographic area of concern 58.

If the EAED 20 is outside the area of concern, the process ends 60. If, however, the EAED 20 is within the geographic area of concern, the EAED presents the emergency alert message 62. The EAED 20 then saves the message for repeat play upon request by a user 64. The message is presented even if no user is there to receive the message. The means of presentation will vary depending upon the interface used by the EAED and/or its host device. If the alert is limited to certain persons (e.g., all police offices or all reserve military), then only those EAEDs 20 used by such persons would present the alert message.

In the most preferred embodiment, the EAED 20 is embedded within a host device. If the EAED 20 is required to deliver an alert message 62, the host device may be used to present the message to the user. In the event the host device is in use for some other purpose, the EAED 20 would override the current operation of the host device so that the emergency alert message is delivered. In the event the host device is turned off when the EAED 20 determines that an alert message is to be delivered 62, the EAED 20 would turn on the host device and deliver the message. The host device may be turned back off again after the alert message has been delivered.

Whether the alert message is delivered 62 or not delivered 60, the EAED 20 returns to ready mode 66 following execution of the preceding steps. In fact, the EAED 20 remains ready to receive messages at all times, and in a preferred embodiment, has a buffer or queue to hold incoming messages while other messages are being processed. This is potentially important because it is possible that a particular EAED 20 could receive numerous messages within a very short period of time. The present invention allows for this, and ensures that any alert message that needs to be delivered to a user will be delivered. In practice, an EAED 20 would take just a few seconds to process a number of alert message/geographic message pairs.

The EAED 20 should be capable of receiving alerts when the device is indoors, in a congested city area with numerous high-rise buildings (i.e., a so-called "urban canyon"), and during all types of weather. Preferably, the EAED will be able to obtain both GPS and alert messages in all these settings, but in the event a real-time GPS signal is not available, it is important that the EAED still be able to receive all alert messages. When this possible, though not desirable, situation occurs, the EAED would use the last reliable GPS location data to determine whether the device is within the geographic area of concern.

The hardware or firmware used by the EAED 20 should be upgradable. This capability allows a user to update the firmware to the most recent version and thus enhances the service provided. This capability also extends the useful life cycle of each EAED.

In a preferred embodiment, an EAED will use a two-step process to determine whether the device is within the geographic area of concern. Step one is a cursory check-a check that can be performed very quickly and with minimal processor use—to determine if the device is located within a large region that includes the geographic area of concern. This cursory check is a crude check using location parameters less precise than those needed for an accurate location fix. But this check may be done quite simply and quickly. By including this step, a large number of emergency alert enabled devices will be quickly excluded from the area of concern, thus preventing those devices from performing needless processing of the more specific location data.

If step one indicates the device is at least near the area of concern, step two would then be an accurate check of the real-time GPS location to determine whether the device is actually within the area of concern. This approach allows the device to quickly and efficiently weed out messages intended for remote areas.

An example of this two-step process helps illustrate the concept. Consider a geographic area of concern that includes three counties in Kansas, a state in the central United States. Step one of the process described above might determine whether the emergency alert enabled device is located within a range of latitude and longitude coordinates that encompass the entire central United States. Alternatively, step one could compare the first digits of the latitude and longitude of the emergency alert enabled device's most recent GPS fix to the coordinates of the geographic area of concern. These crude, initial checks could be used to screen out emergency alert enabled devices that are far away from the geographic area of concern.

A variety of different alerts types may be used. For example, alerts could be prioritized, with the highest level corresponding to life-threatening situations; level two could be reserved for severe property damage situations; level three for traffic alerts; level four for amber/silver alerts, weather alerts that are not within higher-priority categories, and other less severe situations. Alternatively, the alerts could be linked to the color-coded alert system developed by the United States Department of Homeland Security. Alert categories and priorities can be set by the relevant operational authority.

The use of real-time GPS information, combined with the ability to store previously received alert and geographic area messages provides another important capability that is not available using other technologies. The current invention can provide a relevant alert to a user who was outside the alert area when the alert message was transmitted, but who enters the alert area while the alert remains active. When the EAED recognizes that it is moving, it may compare its GPS location over time to all geographic areas of concern for active alerts. By doing so, the EAED would recognize when a user has moved into a geographic area of concern, and would then provide the relevant alert message.

The converse is also possible. That is, when a person who is moving leaves the geographic area of concern, the EAED would recognize this fact and would stop triggering the alert message for that area of concern. This capability greatly enhances the utility of the present invention. It reduces over inclusive emergency message presentations and avoids under inclusive presentations, too. The invention has the ability to notify all persons within the geographic area of concern on a dynamic basis.

To take this capability one step farther, an EAED could be programmed to inform a moving user that he or she is approaching an alert area before the area has been entered. A more stern warning could be used as the person gets closer to the alert area. On the other hand, when a person is leaving an alert area, the EAED could be programmed to inform the user that he or she has just exited the alert area and is out of danger. This feature could be used when the alert area is moving, when the EAED (i.e., the user) is moving, or both.

For example, consider a hurricane evacuation order based on the predicted path of a storm. As the storm moves, the alert area may change. As a person begins evacuating the area, that person's EAED would also move. The present invention can provide updated information to the user based on changes to his or her location and changes to the storm warning area. Not only could this allow users to realize when they have left the evacuation region, but it could also inform persons who might be evacuating in the wrong direction. This could occur if a user is traveling the same direction the storm has shifted towards. The present invention could be used to inform this user that the storm warning area has shifted in the same, or a similar, direction to the direction the user is currently traveling. This type of alert would warn such a user to take a different evacuation route. These types of dynamic capabilities of the present invention are not possible with other technologies.

The dynamic capacity of the present invention also could be used to determine when users are traveling and by what means. If the EAED is moving at high speeds (e.g., greater than 150 miles per hour), the device may be able to confirm that the user is flying. If the EAED is located on a road and is moving, the user can be assumed to be in a motor vehicle. This additional information could be used to determine whether certain alerts should be provided to such users.

All clear alert messages may be used, too. Such messages would be transmitted to all persons within the prior area of concern to inform them that the threat has passed. Similarly, if the threat level changes (either up or down) such changes may be readily and efficiently transmitted to all persons within the relevant geographic area. The invention could be configured so that all clear messages are only presented to users who received the prior alert message.

When an EAED 20 is embedded within a cell phone, an incoming alert may be treated as an incoming call, thus triggering call-waiting and caller-identification features available on many such phones. Alternatively, if the user is making or participating in a call at the time an alert is received, the invention could be configured to provide some type of warning without blocking or overriding the user's phone call. This capability could be used only if the incoming alert is of high priority, where, for example, the EAED could present a momentary audible warning signal to the user, a display that a high priority emergency alert message has been received, or any other means of contemporaneously notifying the user of the fact that a high priority alert has been received without overriding the user's call. On phones with the capability, an incoming alert may be displayed as a text message without interrupting a call in progress.

All EAEDs would be able to receive messages, even when the host device is turned off. This ensures that no alerts are missed. If a relevant alert is received when the host is off, the host is switched on and the alert message is presented to the user. Or if the host device was in a different mode (e.g., a car stereo playing a CD or a cell phone playing an mp3 music file), the host is changed to the alert display mode and the alert is presented. After the alert message has been presented, the host device could be switched back off or returned to its prior operating mode. This capability could be limited to only high-priority alert messages, or to other types of messages selected by the user (e.g., traffic alerts). Similarly, certain lower-priority alerts might be presented only during hours the user is expected to be awake. Most users would not want to be awaken at 3:00 am to be informed that there has been an accident on a nearby freeway, unless, of course, the accident caused the release of a dangerous chemical, started a large fire, or caused other more serious results.

Uniform alert tones may be used to ensure users become familiar with the warning signals. A few different and clearly distinct tones could be used to identify different categories of alerts. EAEDs should be required to participate in periodic system tests. This operation is important to ensuring the proper operation of the EAED and the overall system.

Though the present invention is expected to have it highest utility as an emergency alert system, it also has other commercial applications. Commercial data (of small size) could be transmitted to users within certain areas. If the users' EAEDs have been preset with unique identifying codes, commercial messages could be targeted to users of certain types within certain areas. This capability could be used for highly targeted advertising, though this use should not be allowed to reduce the effectiveness of the system as an emergency alert system.

The present invention also could be used to allow users to subscribe to certain news or information feeds or services. Breaking news, stock market information, sports results and other such information could be provided using the present invention. The present invention could disable such services when the device is moving within a certain speed range (e.g., the range of speeds typically used in motor vehicles).

Clubs, groups, and employers could use the present invention to reach all persons within certain areas. For example, a large employer could advise all workers within a certain region that they should not report to work because of bad weather conditions. Schools could use this feature to advise parents and students of school closure days. Even political candidates and campaigns could use the present invention to target voters within certain areas with messages tailored to such areas. Or campaign workers within a particular area could be advised of the need to work on a certain project.

Figure 5:
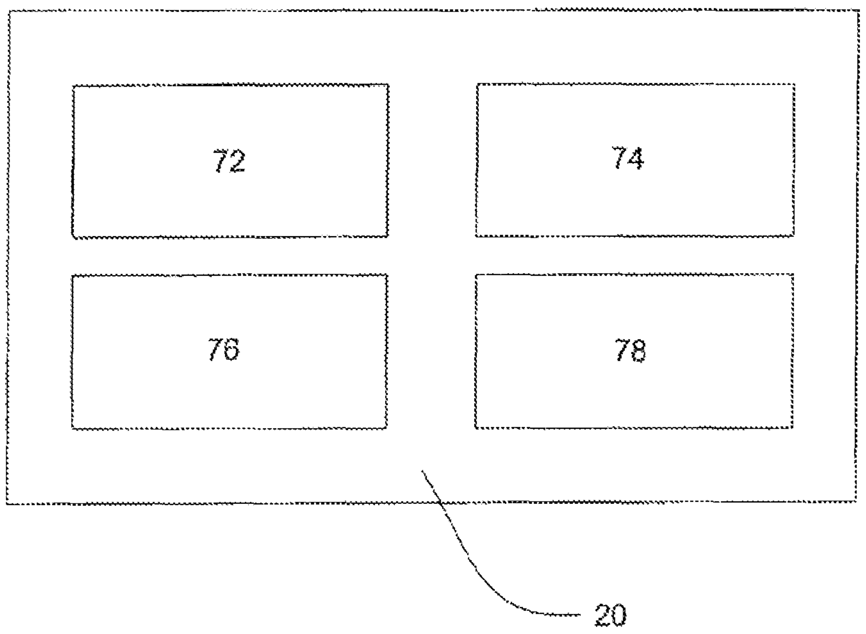
FIG. 5 is a block diagram of another preferred embodiment of the present invention.

A block diagram of an EAED 20 is shown in FIG. 5. The blocks represent a geographic position module 72, a satellite message receiver 74, an emergency alert message interface 76, and a data processor 78. The geographic position module 72 in a preferred embodiment is a highly-sensitive GPS receiver. Because the EAED 20 must remain on at all times and must be capable of fixing geographic position even when a user is indoors or under heavy tree cover, there is a need for a GPS receiver with very high sensitivity and very low power consumption.

GPS receivers satisfying these requirements may be obtained from a variety of sources. One model that has worked well is made by u-blox, a German company specializing in GPS technology. u-blox makes a variety of GPS receivers, and has developed extraordinarily sensitive receivers. GPS satellites must transmit continuously, and for this reason, these satellites transmit at very low power levels. This has caused reception problems with GPS receivers in the past. Many GPS units lose their signal when the unit is inside a vehicle, under dense tree cover, or indoors. In addition, many GPS units are slow to acquire a position. It is highly desirable to avoid such shortcomings in the present invention.

The u-blox GPS receivers combine highly sensitive antennas with sophisticated data processing. Some u-blox receivers include a dead reckoning feature that helps estimate current position of a unit even if GPS satellite data is momentarily lost. In addition, the u-blox GPS receivers are ultra-low power consumption devices, using less than 50 mW of power. The u-blox 5 is the latest generation u-blox GPS chipset, and it is expected that this chipset would work well with the present invention. u-blox claims that this chipset acquires a GPS fix in less than one second. Quick and accurate fix acquisition is highly desirable for the present invention.

If a GPS fix may be reliably obtained very quickly, it is possible for the geographic position module 72 to power down during regular operation of the EAED 20. The geographic position module 72 could obtain a GPS fix on a periodic basis, and could be configured to obtain a fix when a geographic area message and an emergency alert message are received from a satellite. Such operation may reduce the power consumption of the geographic position module 72, and thus reduce the overall power demands of the EAED 20.

The invention will work with any low-power, high sensitivity GPS receiver. The ublox receivers are a currently preferred embodiment, but there is a great deal of competition within the GPS receiver market. In addition, a new generation of improved GPS satellites will be put into operation in the future. These new satellites will have higher transmission levels than the existing GPS satellites. When these new satellites become available, the sensitivity concern may be less important than it is today. The power consumption concern, however, may remain important, particularly if the EAED 20 is configured to remain powered up at all times.

The satellite message receiver 74 includes components necessary to receive the alert message and geographic area message from the emergency system satellite 14. Existing technologies used in satellite radio, satellite pagers, or satellite cell phones could be used for this purpose. It is desirable for the satellite receiver to be highly sensitive and consume minimal power. The satellite message receiver 74 may operate in a sleep mode until a signal is received, thus conserving power.

The satellite message receiver 74 must have sufficient sensitivity to reliably receive satellite signals even when indoors, inside a car, or in other situations where there is no clear line-of-sight to the transmitting satellite. This concern is less limiting than the GPS sensitivity issue discussed above because the satellites used by the EAS are likely to transmit substantially more powerful signals than do existing GPS satellites. Satellite pagers and satellite phones have good performance even when the receivers are indoors, and these technologies, therefore, are preferred for the present invention. Satellite radio, in its current state of development, tends to suffer from frequent signal loss, and for that reason, is not currently preferred for this invention. As with GPS receiver technology, it is expected that competition will lead to improvements in the satellite radio receiver technology, and this type of technology may well be a good match for the present invention in the future.

The geographic position module 72 and the satellite message receiver 74 both require a satellite antenna in the most preferred embodiment. Separate antennas could be used, or a single, dual-use antenna could be used. In either case, the antennas selected should have the highest possible sensitivity. In some applications, the host device (i.e., the device in which the EAED 20 is embedded) may have an existing antenna that would provide superior performance and that could be shared by the EAED 20.

The data processor 78 performs the needed analysis of the incoming geographic data received via the satellite message receiver 74 and the current geographic location information received via the geographic position module 72. An evaluation is performed to determine whether the current geographic position of the EAED 20 is within the geographic area of concern. If so, the data processor 78 then sends the emergency alert message to the emergency alert message interface 76. This interface 76 either directly or indirectly presents the emergency message to a user. The data processor 78 also includes sufficient memory to store prior alert messages for replay at a later time. Alternatively, such memory could be provided in a separate module within the EAED 20.

The EAED 20 could be a stand-alone unit or could be embedded within a host device. The latter arrangement is preferred. A wide variety of host devices are contemplated for the present invention. Automobiles, cellular phones, land-line telephones, computers, televisions, radios, mp3 players, and almost any existing or later-developed device that provides text, audio, or video content to an end user. If, however, the EAED 20 is a stand alone unit, the device must also include some means for communicating directly with a user. This could be a visual display screen (e.g., a small LCD display) or an audio system.

To more fully appreciate the operation of the present invention, consider its use in an automobile. The EAED 20 could be incorporated into the design of the automobile in a seamless manner. With a small footprint, low power consumption, and the relatively large source of power via the automobile's large starter battery, the EAED 20 would raise minimal design challenges for an automobile designer. The EAED 20, for example, could be incorporated into the vehicle's stereo system or into a navigation system, if the vehicle was so equipped. The EAED 20 might use an existing antenna on the vehicle to improve satellite reception. The EAED 20 could interface with the audio system in the vehicle to present audio alert messages or with the warning light and/or alarm system to warn the user of the emergency. Many vehicles today have visual displays capable of presenting text messages, and such a capability could be used by the EAED 20 to communicate emergency messages. If a relevant emergency message is received while the vehicle is not in use, the EAED 20 could store the message, and present it to the user the next time the vehicle is used.

If an EAED 20 is embedding into a cellular phone, the invention could interface with the phone to provide audio, text, and potentially video emergency message content. A unique emergency alarm ring-tone could be used to ensure the user recognizes the urgency of the event. If the phone is in use, the EAED 20 could override the existing use and convey the emergency alert to the user.

Embedding an EAED 20 into a television, radio, mp3 player, or other device with some form of audio and/or visual interface is also expected. When an EAED 20 embedded within such a device receives a relevant message, it could turn the device on and convey the alert message. The device could then be turned off again. The message could be stored until a user later turns on the device, at which point the alert message could be provided again.

When the EAED 20 is embedded in a host device that is capable of receiving signals outside the normal transmission bands, the system of the present invention could make use of such bands, and thus reduce interference from other signals. This capability exists for radio transmissions by using sub channels. These sub channels are broadcast spectrum that is current used to send song or other data, but not audio signals. Similarly, television sub channels exist for sending close captioning and other data. These sub channels could be used by the present invention to transmit alert and geographic messages to emergency alert enabled devices embedded in these types of host devices.

The EAED 20 and its host device could be configured to operate regardless of the mode of operation in use at the time. For example, if an EAED 20 is embedded in a television and a movie is being watched via an alternative input, the EAED 20 would still prompt the television to provide the alert message. This capability shows one important advantage the present invention offers over the existing emergency broadcast system (EBS). The EBS will reach only those persons watching a regular television broadcast. If, for example, a user's television is on a Video One input receiving a feed from a DVD player, the EBS cannot reach that user. The EAED 20 of the present invention, however, would reach that user.

The present invention uses satellite transmissions in a preferred embodiment, but is not limited to such use. Other transmission means are also expected, including Internet, cellular, land-line phones, and so forth. Further, the messages of the present invention may be broken into parts for transmission and then reassembled by the emergency alert enabled device. Unique identifiers for each part would be assigned to ensure the emergency alert enabled device can proper reassemble and authenticate the full messages before evaluating the messages.

The different parts of a message may be broadcasts via different means. For example, a message may be broken into three parts. All three parts may be transmitted via satellite, Internet, and cellular systems. The emergency alert enabled device may receive one part of the message from a satellite, one part via the Internet, and one part through a cellular transmission, which could be any form of cellular transmission (i.e., voice, text, or data). The emergency alert enabled device can receive the message parts through different transmission means and properly reassemble and authenticate the messages.

The emergency alert enabled device is further capable of ensuring the transmissions via multiple means does not result in unwarranted repetition of the alert to the user. For example, a certain alert message might be received by the emergency alert enabled device via satellite and cellular transmission. The emergency alert enabled device would recognize that it is the same alert, using unique identifier data provided with the message, and process the alert as a single message. The message would be presented to the user according to the standard presentation protocol of the emergency alert enabled device's firmware, and no repetition due to the multiple transmission means would result. The alert may be presented more than once, but that would occur only if such repetition was warranted, as determined by the emergency alert enabled device's firmware. This process is described more below.

Though the present invention relies primarily on GPS location data, the EAEDs may also used alternative location fixing means. For example, various location fixing processes have been developed using cellular transmission information. If a particular cell phone receives and responds to transmissions from multiple cell towers, a triangulation process may be used to obtain a location fix on the cell phone. The accuracy of such fixes vary a great deal, but it does provide another means of fixing the location of an EAED used in a cell phone.

At least two modified GPS systems have been developed for cell phone users. These systems typically combine a number of features to provide real-time GPS fixes to cell phones. The cell tower locations are precisely fixed, giving a particular cell phone a reference point for the GPS fix process. The GPS satellite data can be stored and transmitted through the cellular system, rather than directly from the GPS satellites, thus reducing the time needed to obtain an accurate fix.

One such system is called assisted GPS (aGPS). It is used on some cell phones, and uses some of the features identified above. A more recent development is the enhanced GPS (eGPS) system. This system also uses a combination of the cellular system and GPS system to provide location fixes to cell phone users. Both systems help reduce the time to first fix and allow for location fixes in areas where GPS signals may otherwise be too weak. The current invention may use aGPS, eGPS, or any other later-developed improvement to the basic GPS system in order to provide more accurate and more timely location information to an EAED. The invention is not limited to only use of the traditional, satellite only, GPS system to fix the position of an EAED.

Another example of an enhancement to the GPS system is the satellite-based augmentation system (SBAS). This enhancement uses a network of ground-based reference stations to measure small variations in the GPS satellites' signals. These signals can vary slightly due to atmospheric conditions. The SBAS approach uses data from the ground-based reference stations to correct for atmospheric variations in the GPS signals. This enhancement was developed for use in aviation, where precise location and elevation data was needed.

The best known of the SBAS solutions is the Wide Area Augmentation System (WAAS), which is used in North America. WAAS uses ground stations located throughout North America and provides improved GPS performance to WAAS-enabled GPS devices within that area. Ocean areas surrounding North America are also covered, and as a result the W AAS capability has become popular with mariners and fisherman, too.

Similar systems have been developed in other regions. In Europe, there is the European Geostationary Navigation Overlay Service (EGNOS), and Japan uses the Multifunctional Satellite Augmentation System (MSAS). Over, similar systems, are used in other regions. The present invention may use any of the SBAS systems within the EAED to improve the location accuracy of GPS fixes. These systems would also enhance elevation data obtained by an EAED.

The use of elevation data by an EAED may allow the device to determine, for example, when a user is flying (i.e., when speed and elevation are high), which may be relevant in different ways. The EAED may switch to an airplane mode when such conditions are detected, and thus prevent presentation of most alert messages. Certain alerts, however, might still be presented. The EAED firmware would be programmed to provide the type of discrimination desired. Messages that should not be transmitted during flight could be coded in a certain manner, while emergency alerts that should be transmitted during flight might be coded differently. An example of a message that might be presented even during a flight would be a message that the plane is approaching a dangerous area or some other type of message directly relevant to persons flying. It is anticipated, that under current rules, few, if any, alert messages would be presented to users during flight. Such rules may change, however, and the present invention may be used in any manner appropriate to the existing rules and conditions.

GPS is widely used by the military, and this fact has led to use of GPS jamming technologies. Various anti jamming solutions have been developed. Boeing, Raytheon, Lockheed-Martin, and uBlox are but a few of the commercial providers of anti jamming GPS technologies. Technology is expected to continue to develop in this area. The present invention may incorporate anti jamming technology, of any sort, into the EAED.

The EAED may be constructed in a number of ways, and the present invention is not limited in this regard. In one preferred embodiment, all four of the blocks represented in FIG. 5 could be incorporated into a single chip. In another embodiment, the GPS capability may be present in the host device (e.g., a GPS-enabled cell phone of a dedicated GPS device), and the EAED would not need to provide duplicate GPS capability. In that situation, the EAED may need an interface to the existing GPS unit within the host device.

In yet another embodiment, the EAED might use three physical components: an antenna, a single chip GPS receiver, and a single chip EAED receiver. The two receiver chips might be separated for different reasons, including, for example, the possible presence of a GPS chip within the host device, as mentioned above. Both the GPS receiver and the EAED receiver would have certain common, general features. Both would have an RF signal processor to handle the incoming signals from the antenna. Both would have some internal memory, and both would have a processor. In a general sense, the single GPS chip mentioned here would represent the geographic position module 72, and the single EAED chip would include the satellite message receiver 74, the emergency alert message interface 76. Both chips could have a data processor, but the data processor 78, as shown in FIG. 5 would be within the EAED chip.

Figure 6:
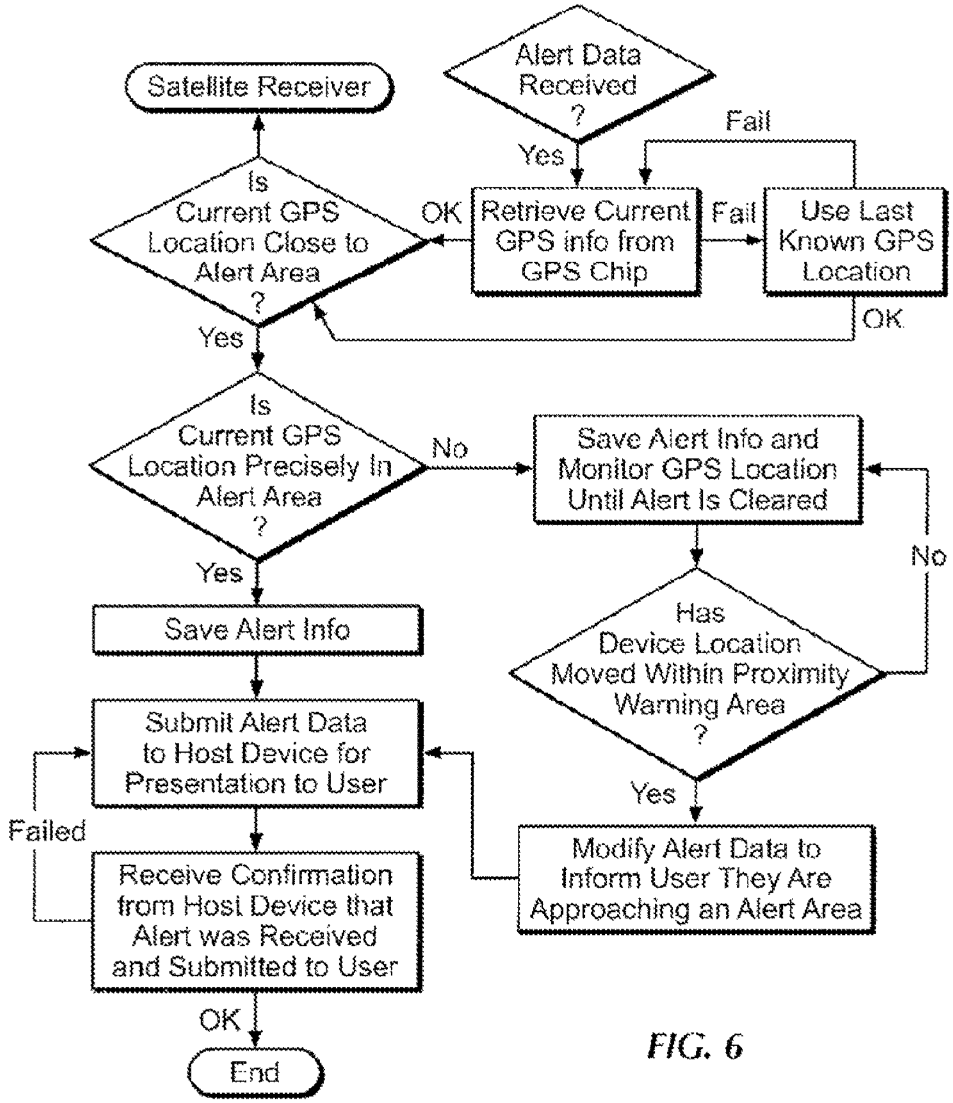
FIG. 6 is a flow chart for one embodiment of an EAED.
Figure 7A:
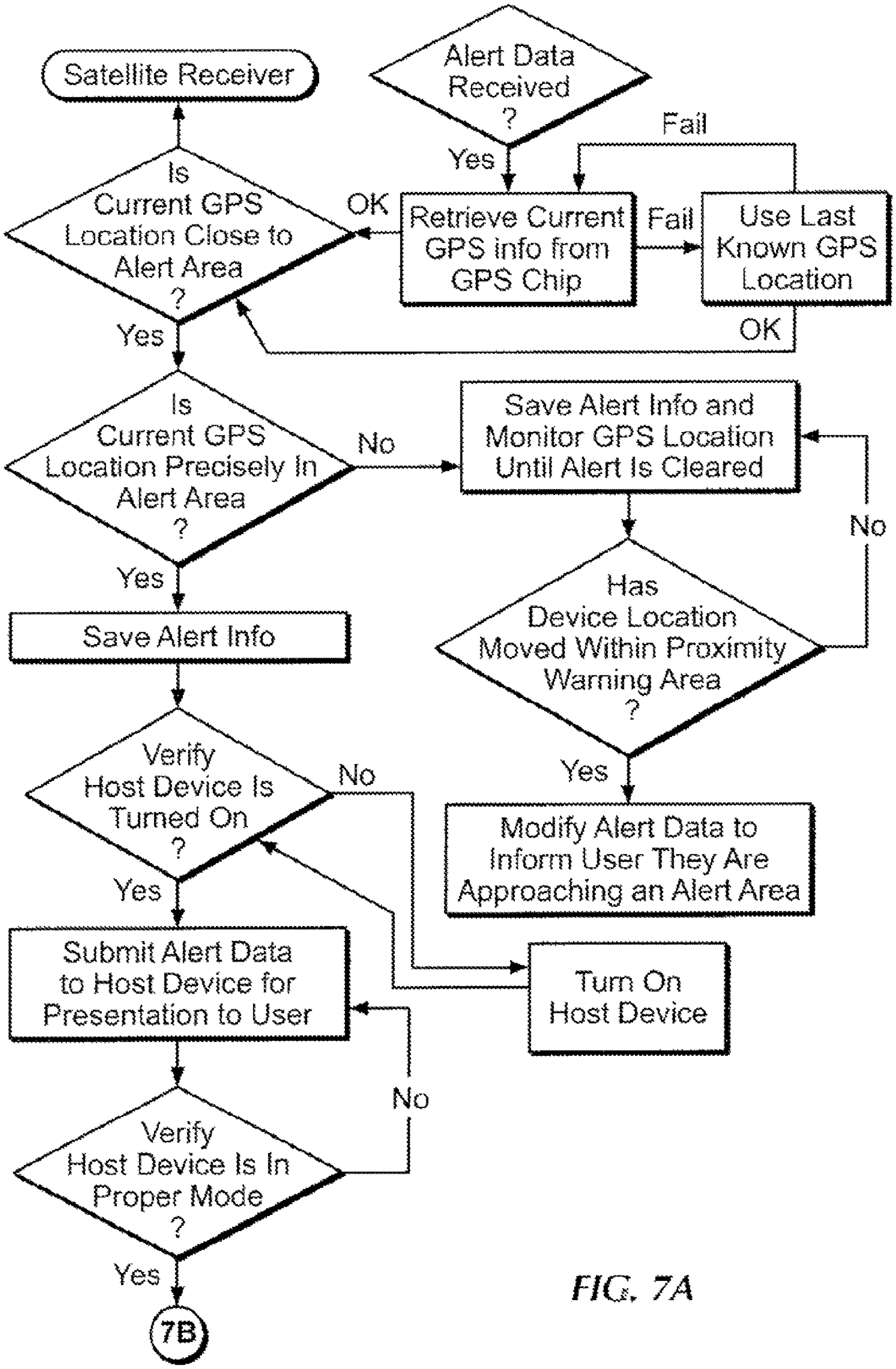
FIGS. 7A-7B depict a flow chart for a second embodiment of an EAED.
Figure 7B:
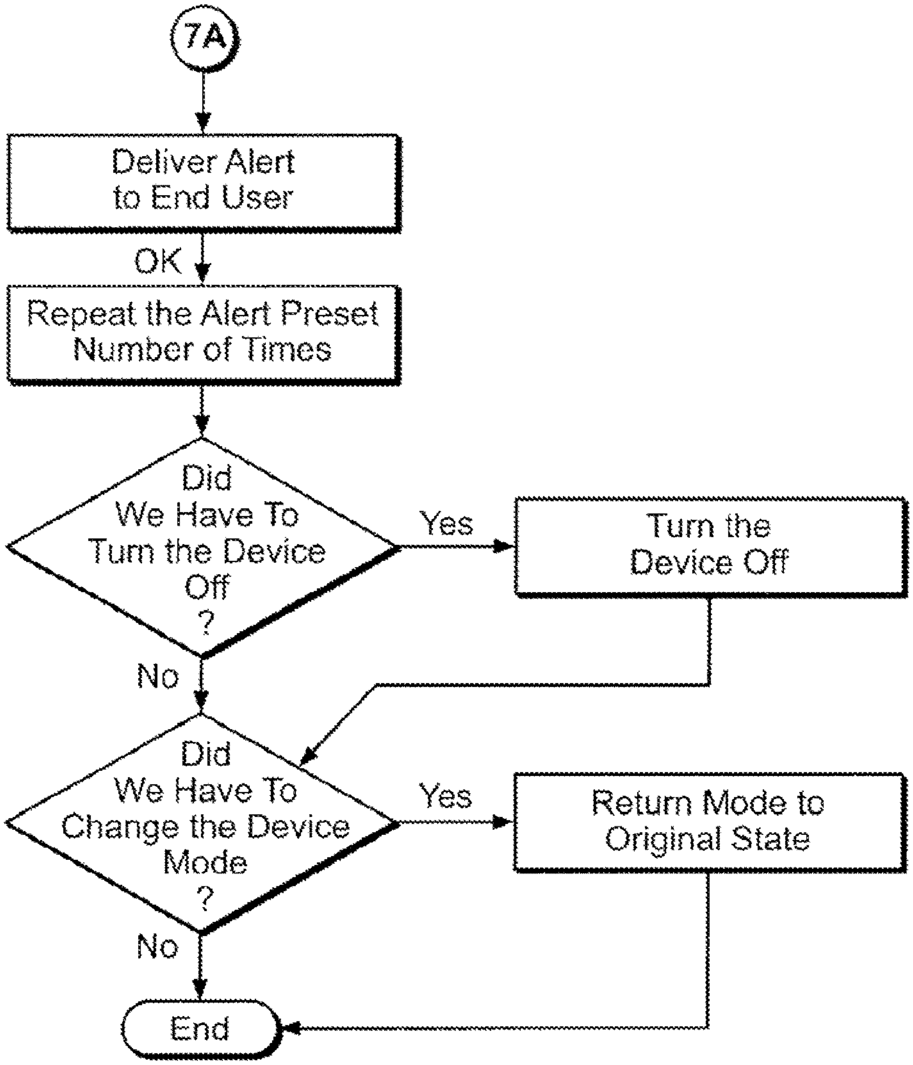

To better appreciate the operation of the EAED, flowcharts are provided in FIGS. 6 and 7. These flowcharts represent two basic modes of operation for the EAED. The firmware on the EAED would be constructed and programmed to perform the functions identified in the flow charts. FIG. 6 shows how the EAED would function with a "smart" host device, that is, a host device that is capable of communicating back with the EAED. In a smart host, the host device can instruct the EAED that an alert message has been received by the user. For example, a user with a cell phone may click a "Yes" button on the phone to confirm receipt of an alert message. The cell phone (i.e., the host device) would then confirm receipt to the EAED. In a "dumb" host, the ability to transmit from the host to the EAED is absent. This fact requires different operations by the EAED, as shown in FIG. 7.

Turning to FIG. 6, the flowchart begins with the satellite receiver. The alert data received step determines whether a full alert message has been received. This may involve comparing authentication data to stored data and it may also involve reconstructing an alert message sent in parts. An alert message could be sent in multiple parts via different transmission paths. For example, an alert might be broken into four parts, with one part received via satellite, one by cellular transmission, one by the Internet, and one by Wi-Fi or some other means. But whatever the process for getting the message parts to the EAED, the alert data received block represents the processing and reassembly of the message. If all parts of a message are received and reassembled into proper order, then this step leads to the retrieve current GPS info from GPS chip block. At this stage, the EAED checks for a current GPS location fix. Other means of obtaining a location fix may be used, and the GPS reference here is intended to represent a preferred embodiment and not a limitation on the scope of the invention. If no current location fix data is available, the EAED will use the last known GPS location data. In either event, the GPS data (or other location data) will be sent on to the comparison block. At that stage, the EAED uses the geographic area component of the alert message and the location data to determine whether the EAED is close to the geographic area of concern. If not, the process stops and the message is not stored. In an alternate embodiment, the message could be stored for some period of time and rechecked to determine if the user is moving toward the alert area. This capability is not illustrated in FIG. 6, but is within the scope of the invention.

If the EAED determines that it is close to the geographic area of concern, a second check is made to determine if the EAED is precisely within the alert area. If not, the alert info and message are stored until alert is cleared. If this happens, the EAED will check to see if it is moving, and if so, whether it is moving toward the alert area. If the EAED is moving toward the alert area, a message to that effect is presented to the user. If the EAED is stationary or moving away from the alert area, the alert is saved and the EAED's position is checked periodically for movement toward the alert area. This aspect of the EAED's operations can be altered to fit the needs or desires of a user. For example, some users may want to be alerted if they are within a certain distance of an alert area, even if they are not moving or are moving away from the area. These types of choices may be programmed into the EAED firmware to suit a particular user's preferences. FIG. 6 shows only a basic version of a preferred embodiment.

Returning to the determination of whether the EAED is within the alert area, if the answer to that query is yes, then the alert information is stored. The alert is also presented to the user at this time. The EAED then looks for confirmation from the host device that the user has received the alert message (i.e., either the primary alert or a warning that the user is moving toward the alert or any other message presented). If the host device confirms that the user has received the message, then the process ends. If no confirmation is received, the EAED will periodically represent the message to the user via the host device. If no confirmation is ever received, this process will continue as long as the alert is in effect.

The flowchart shown in FIG. 6 is based on a smart host device that is in a proper mode for message receipt and presentation. A cell phone is a good example of such a device, when the cell phone is on. The phone may be in standby mode, but is still capable of presenting an alert message to a user, via text, voice, video, or some combination. If, however, the smart device is off, the present invention will still work. The EAED may have the capability to turn on the smart device to present a message. The EAED is always on, a characteristic explained more in the following description of an EAED designed for use in a dumb host device.

A similar process is used for a dumb host device, but the latter parts of the process are different because the host device is not capable of confirming receipt of the message. The satellite receiver functions to receive the alert message, with both the geographic message and alert message components. The EAED checks to see that a complete and authentic alert message has been received. It then checks the GPS data (or other location data). If no current location data is available, the last known data is used. The first comparison is then done to determine if the EAED is close to the alert area. If it is, a second geographic comparison is done to see if the EAED is within the alert area. If not (i.e., the EAED is close to the alert area, but not within it), the alert is saved and the GPS data is checked for movement toward the alert area. If such movement is detected, an appropriate message is presented to the user. If the EAED is found to be within the alert area, the alert message is saved.

At this point, the EAED checks to see if the host device is on. If not, the EAED turns on the host device (e.g., a television or car stereo). The EAED then checks to see if the host device is in the proper mode for presentation of an alert message. For example, if a car stereo is playing a CD, the alert message could not be presented. If the host is not in the proper mode, the EAED sets the device to the proper mode and then confirms that setting. The EAED then presents the alert message via the host device. The alert is presented periodically for a preset number of times or until the alert has cleared.

Once the alert presentations are completed, the EAED checks to see if it had to turn on the host device. If so, the EAED turns off the host device, thus restoring it to its former condition. The EAED then checks to see if it had to change the mode of an operating host device. If so, the EAED returns the host device to the prior operating mode. Once these restorative steps are complete, the process ends. These steps may also be used with the smart host to address hosts that may be turned off or in a mode that would not allow effective alert message presentation to a user.

In one preferred embodiment of the EAED, the GPS function is on a single chip, the satellite receiver function is on another chip, and the primary EAED firmware is on a third chip. These chips could be fabricated as part of a single package, but are described as separate chips to emphasize their distinct operations. The GPS chip may power on periodically or remain always on, depending on the power supply of the host device. The conserve power consumption, the GPS chip may operate only periodically. The satellite receiver chip is a low-power chip that is always on. It receives messages on the specific satellite frequency used by the EAS. The receiver chip checks message parts and reassembles messages sent in pieces. When a full, authentic message has been received, the satellite receiver sends this message to the firmware chip. This triggers the firmware chip to power on. By keeping the firmware chip dormant until a full, authentic message has been received, the power consumption is reduced. The firmware chip then performs most of the steps identified in either FIG. 6 or FIG. 7, as described above.

The EAED may use GPS data to determine the speed and elevation of a moving host device. In addition, the EAED may include an accelerometer, gyroscope, or other means to determine and monitor motion. These devices may be used by the EAED to determine if a crash has occurred, for example, when movement above a certain speed (e.g., 20 mph) has suddenly stopped or by detecting a stopping g force in excess of some preset limit. Whatever means is used, if an EAED within a smart device detects a crash, the EAED may then send crash and location information to emergency service providers; the police; contacts stored by the host device, or third-party monitoring services. This information may be sent by cellular transmission (3G, 4G, SMS, MMS, or other later-developed means), the Internet, Wi-Fi, or any other means available to the host device.

The accelerometer, gyroscope, or other motion detection means also could be used for personal safety reasons. It could be used, for example, to identify when a user has fallen. This feature could be used with at-risk users to automatically contact appropriate persons when the user has fallen. The capabilities might also allow the EAED to disable certain features when the host device is moving at a speed indicative of car travel.

The EAED may also interact with a smart host in other ways to enable remote monitoring of a users actions. The EAED may receive a signal, via any means (e.g., cellular, Internet, satellite, etc.), to initiate monitoring of the location and movements of the device. The EAED may also be instructed to photograph or video using the host device's capabilities. This type of monitoring might be used by parents or by law enforcement under appropriate circumstances. For example, this capability by the EAED might allow parents to monitor their children's driving practices.

The EAED's integrated back-end use of location date could be used for commercially targeted messages, too. This practice could be used to notify users who fit a certain demographic profile when they are within a certain distance of a store or other facility. For example, a person within the target demographic group for a store having a sale might use this technology to notify such persons who are within a selected distance of the store. Though geographically-targeted advertising has been done, it has relied primarily on front-end message discrimination. The present invention takes advantage of real-time location information and the ability to perform the discrimination steps within the host device. This provides more accurate and thus, more finely-targeted messaging. Such messaging could be used for emergencies (as is the primary purpose of developing the system), civil announcements (e.g., a parents' meeting at a local school), or commercial messaging, as described in this paragraph. These and other uses of the system are possible because of the EAED's ability to receive messages with geographic or other targeting information, then determine, at the host device level, whether those requirements are met.

The foregoing examples of applications of the present invention are by no means exhaustive. It is expected that the EAED 20 of the present invention will be embedded in a wide variety of electronic products. The particular manner in which the EAED 20 is integrated with such products is left to the manufacturers and designs of the products. The present invention provides the EAED technology and an EAS method of operation. The manner in which EAEDs 20 are integrated into host systems is expected to vary a great deal.

I claim:

1. An alert enabled system, comprising:

an alert transmission center that transmits an alert message and a geographic area message that is representative of a geographic area of concern;

an alert enabled device including:

an antenna;

a geographic position module;

an alert message receiver configured to receive the alert message via the antenna;

an alert message interface; and, a processor, operatively connected to the geographic position module, the alert message receiver, and the alert message interface, the processor configured to perform the following tasks:

i. reassemble incoming messages, if necessary;

ii. authenticate incoming messages;

iii. determine whether the emergency alert enabled device is located within the geographic area of concern using data from the geographic area module; and, iv. present relevant alert messages to a user via the emergency alert message interface.

2. The system of claim 1, wherein the processor further comprises: a. a first processor unit for reassembling parts of received messages, if necessary, and authenticating incoming messages; and, b. a second processor unit for determining whether the alert enabled device is located within the geographic area of concern, and if so, for presenting an alert to the user.

3. The system of claim 1, further comprising an antenna, wherein the alert message receiver is configured to receive signals from the antenna.

4. The system of claim 3, wherein the alert message receiver and the means for determining a real-time location of the alert enabled device are both configured to receive signals from the antenna.

5. The system of claim 1, wherein the alert enabled device is embedded in a host device.

6. The system of claim 5, wherein the alert enabled device is configured to receive messages via the antenna of the host device.

7. The system of claim 5, wherein the alert enabled device is powered by the same power supply that powers the host device.

8. The system of claim 5, wherein the host device is capable of transmitting data to the alert enabled device.

9. The system of claim 1, wherein the geographic position module comprises a GPS module.

10. The system of claim 1, wherein the alert enabled device is capable of using speech to text technology to provide text alert messages to users.

11. The system of claim 1, wherein the alert enabled device is capable of using text to speech technology to provide audible alert messages to users.

12. The system of claim 1, wherein the alert enabled device is capable of producing a vibration alert.

13. The system of claim 1, wherein the means for determining a real-time location of the alert enabled device is capable of determining the alert enabled device's real-time location when the device is indoors, in inclement weather, or in a congested urban location.

14. The system of claim 1, wherein the alert enabled device retains prior location data during periods in which accurate, realtime location data is not available, and the device uses the most recent, accurate location data to determine whether the device is within the geographic area of concern.

15. The system of claim 1, wherein the alert message is an emergency alert message.

16. The system of claim 1, wherein the alert message is an educational message.

17. The system of claim 1, wherein the alert message is an informational message.

18. The system of claim 1, wherein the alert message is a commercial message.

19. The system of claim 1, wherein the alert message is targeted advertisement.

* * * * *